G. W. Low,
Wood Auger.

Nº 41,517.      Patented Feb. 9, 1864.

Witnesses.

Inventor.

UNITED STATES PATENT OFFICE.

G. W. LOW, OF CHILLICOTHE, OHIO.

IMPROVEMENT IN AUGERS FOR BORING WOOD.

Specification forming part of Letters Patent No. 41,517, dated February 9, 1864.

*To all whom it may concern:*

Be it known that I, G. W. LOW, of Chillicothe, in the county of Ross and State of Ohio, have invented a new and useful Improvement in Bits or Augers for Boring Pumps and other Articles; and I do hereby declare that the following is a full, clear, and exact description of the same, reference being had to the accompanying drawings, making a part of this specification, in which—

Figure 1:
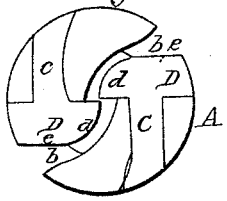
Figure 2:
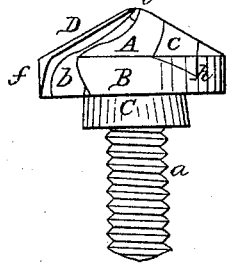
Figure 3:
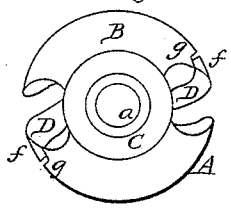

Figure 1 is a face view of my invention; Fig. 2, a side view of the same; Fig. 3, a back view of the same.

Similar letters of reference indicate corresponding parts in the several figures.

To enable those skilled in the art to fully understand and construct my invention, I will proceed to describe it.

A represents the head of the bit or auger, which is provided with a screw, $a$, for the purpose of securing it to a proper shank or spindle. The face of the head A is of conical form, having a cylindrical base, B, and a shoulder, C, as shown clearly in Fig. 2. The head A has two curved slots or recesses, $b\ b$, made in it to serve as throats to admit of the escape of the shavings.

D D represent two knives or cutters, each of which has an arm, $c$, projecting from its back edge at right angles, as shown in Fig. 1. The inner ends of these knives or cutters are made of rounded form, as shown at $d$ in Fig. 1, the other parts, $e$, which are on the face, being straight, and the other parts, $f$, which are at the base B, being flush with the same and curved at their cutting-edges. The slots or recesses $b$ gradually increase in width from their inner to their outer ends, and the knives or cutters project beyond or over one side of the same and rest in recesses $g$ at the edges of the slots $b$, as shown in Fig. 3.

The arms $c$ of the knives or cutters are made of dovetail form, and they are fitted in dovetail grooves $h$ in the head, the arms being shoved into the grooves longitudinally until the back edges of the knives or cutters fit into the slots or recesses $b$. The dovetail arms $c$ fitting in the dovetail grooves $h$ hold the cutters or knives firmly in position, and at the same time they admit of them being readily removed or detached for the purpose of sharpening, and also readily applied or fitted to the head.

If necessary or desired, a screw may be passed through each arm $c$ into the head A.

I design to have the head A made of steel. The knives or cutters will of course be of steel.

Having thus described my invention, what I claim as new, and desire to secure by Letters Patent, is—

The combination of the cutters D, rectangular projecting arms $c$, and grooves $h$ in the head A, when the said parts are constructed and arranged as herein specified, so that the action of boring will press the arms $c$ into their grooves and thus retain the cutters securely in position without the aid of screws or keys.

G. W. LOW.

Witnesses:
JOHN BROWN,
SAMUEL LUNBECK.